United States Patent
Ishii et al.

(10) Patent No.: US 7,277,251 B2
(45) Date of Patent: Oct. 2, 2007

(54) DATA RELIABILITY IMPROVEMENT AT LOW TEMPERATURE

(75) Inventors: Satoshi Ishii, Kanagawa (JP); Masato Taniguchi, Kanagawa (JP); Tetsuo Ueda, Kanagawa (JP); Noboru Yoshida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/266,129

(22) Filed: Nov. 2, 2005

(65) Prior Publication Data

US 2006/0092550 A1    May 4, 2006

(30) Foreign Application Priority Data

Nov. 2, 2004  (JP)  ............................. 2004-319246

(51) Int. Cl.
*G11B 21/02*   (2006.01)
(52) U.S. Cl. ...................................... 360/75
(58) Field of Classification Search ...................... None
See application file for complete search history.

(56) References Cited

U.S. PATENT DOCUMENTS

| 5,991,113 | A  | * | 11/1999 | Meyer et al. ................. 360/75 |
| 6,433,310 | B1 | * | 8/2002  | Wickramasinghe et al. . 219/216 |
| 6,441,982 | B1 | * | 8/2002  | Fukushima et al. ........... 360/59 |
| 6,452,735 | B1 | * | 9/2002  | Egan et al. .................... 360/31 |
| 6,493,183 | B1 | * | 12/2002 | Kasiraj et al. ............... 360/126 |
| 6,963,464 | B2 | * | 11/2005 | Xu et al. ....................... 360/75 |
| 6,972,919 | B2 | * | 12/2005 | Suk ............................... 360/75 |
| 7,092,195 | B1 | * | 8/2006  | Liu et al. ...................... 360/75 |
| 7,097,110 | B2 | * | 8/2006  | Sheperek et al. ........... 236/1 C |

FOREIGN PATENT DOCUMENTS

JP      2004-079126     3/2004

* cited by examiner

*Primary Examiner*—K. Wong
(74) *Attorney, Agent, or Firm*—Townsend and Townsend and Crew LLP; Rambod Nader (57) ABSTRACT

Embodiments of the invention perform a stable data write operation at a low operating ambient temperature and promptly perform a write command process within a magnetic recording apparatus that employs a load/unload design. In one embodiment, write heads unloaded on a ramp are completely preheated before magnetic disks reach their rated rotation speed. This preheat operation takes time T1. After completion of write head preheating, the write heads are loaded from the ramp. This loading operation takes time T2. Since time T1 and time T2 do not sequentially elapse, it is possible to prevent a write operation from being rendered unstable by thermal protrusion while expediting a write command process.

20 Claims, 7 Drawing Sheets

DATA RELIABILITY IMPROVEMENT AT LOW TEMPERATURE

CROSS-REFERENCES TO RELATED APPLICATIONS

This application claims priority from Japanese Patent Application No. JP2004-319246, filed Nov. 2, 2004, the entire disclosure of which is incorporated herein by reference.

BACKGROUND OF THE INVENTION

The present invention relates to a technology for performing a stable data write operation at a low operating ambient temperature within a magnetic recording apparatus that employs a load/unload design, and more particularly to a technology for completing a stable data write operation within a short period of time at a low operating ambient temperature.

The magnetic head for use in a magnetic disk drive, which is a typical magnetic recording apparatus, is formed at the end of a slider, which is made of an Al—Ti—C sintered body, by using a thin-film process. A combination of the magnetic head and slider is hereinafter referred to as the head/slider assembly. An air-bearing surface (hereinafter referred to as the ABS) is formed on a magnetic disk surface that faces the head/slider assembly. When a viscous airstream, which is generated over a rotating magnetic disk, passes through a gap between the ABS and magnetic disk surface, the ABS receives buoyancy. The head/slider assembly is then thrust upward from the magnetic disk surface and placed at a position where the buoyancy is in balance with the pressure load of a slider-supporting head gimbal assembly (hereinafter referred to as the HGA). As a result, a gap within a predetermined range is maintained between the magnetic head and magnetic disk magnetic layer while the magnetic disk rotates. To permit the magnetic head to perform a stable write operation on the magnetic layer, it is necessary that the gap between the magnetic head and magnetic layer be maintained within the predetermined range.

If the magnetic head is positioned too close to the magnetic layer, the head/slider assembly may come into contact with the magnetic disk surface, thereby damaging the magnetic disk and magnetic head. If, on the contrary, there is an excessive gap between the magnetic head and magnetic layer, an unstable data write operation results due to reduced magnetic coupling between the magnetic head and magnetic layer. The magnetic head generally comprises an inductive write head and a GMR or MR read head. The inductive write head comprises a coil, a magnetic pole piece, and a write gap. The GMR read head uses a giant magnetoresistive element, whereas the MR read head uses a magnetoresistive element.

When a write current flows to the write head for the purpose of writing data onto the magnetic disk, heat is generated due to resistance that is provided by a write head coil. This raises the ambient temperature of the coil. In this instance, thermal protrusion occurs due to a thermal expansion coefficient difference between the materials of the write head and slider main body. In thermal protrusion, a write gap section, which is formed by the write head magnetic pole piece, protrudes from the ABS. Even if the gap between the head/slider assembly and magnetic disk surface remains unchanged, thermal protrusion (hereinafter referred to as thermal expansion) varies the gap between the write head and magnetic layer to the detriment of write operation stability.

The technology disclosed by Patent Document 1 (Japanese Patent Laid-Open No. 79126/2004) provides a magnetic disk drive that not only reduces a read error occurring at a low temperature, but also enlarges the operating temperature range while maintaining high reliability and high stability by avoiding a head/media crash, which may occur between the magnetic head and magnetic disk of a magnetic disk drive having an increased recording density. The technology disclosed by this document also moves the magnetic head to its unloading position temporarily before performing an advance pseudo-write operation.

In recent years, the gap between the magnetic head and magnetic disk has decreased in addition to an increase in the magnetic disk recording density. Consequently, the recording performance has been greatly influenced by a change in the gap between the head/slider assembly and magnetic layer. In this specification, the gap between the write head and rotating magnetic disk surface is hereinafter referred to as the fly height. Thermal protrusion, which is generated by Joule heat when a write current flows to the write head coil, decreases the fly height prevailing after the write head temperature is raised by a write operation continuously performed for a specified period of time, to a level lower than the fly height prevailing while the write head temperature is low immediately after the beginning of a write operation.

While the magnetic disk is rotating, it is necessary to prevent the write head from coming into contact with the magnetic disk wherever possible. Therefore, the ABS and HGA parameters related to the fly height are determined with reference to a low fly height that prevails when the write head temperature is raised. However, the write head may not be able to magnetize the magnetic layer with an adequate magnetic field strength due to an increased gap between the write head and magnetic layer because the fly height is increased before thermal protrusion. When, in reality, a write command and user data were received from a host computer and written onto the magnetic disk, it was found that the soft error rate (hereinafter referred to as the SER) of approximately 20 leading data sectors into which the user data was written, including a sector containing a first address, was higher than in the subsequent data sectors.

In a magnetic disk drive that employs the load/unload design, the magnetic disk rotation is stopped in a power supply stop mode or standby mode with the write head unloaded onto the ramp. If the operating ambient temperature of the magnetic disk drive is low, the write head temperature decreases while the write head is unloaded onto the ramp, thereby increasing the fly height for the next write operation. Therefore, if a write command is received to start a write operation after the write head is unloaded onto the ramp, a stable data write operation may not always be performed.

BRIEF SUMMARY OF THE INVENTION

If a write command is received from the host computer, a magnetic disk drive in a stop mode or standby mode needs to process the command as soon as possible. When the magnetic disk drive in the stop mode or standby mode is about to execute the write command, it controls a carriage so as to load the magnetic head that has been unloaded onto the ramp after rotating the magnetic disc to reach a rated rotation speed. Loading is an operation that is performed to move the head/slider assembly from the ramp toward the magnetic disk surface. Unloading is an operation that is performed to move the head/slider assembly, which is flying above the magnetic disk surface, from the magnetic disk surface to the ramp.

If a loading operation is performed after a current is supplied to the write head, which is unloaded onto the ramp, in order to invoke thermal expansion, the write command processing performance deteriorates because the processing time increases accordingly. Further, a predetermined period of time is required for the head/slider assembly to move from its unloaded location on the ramp to a magnetic disk cylinder for a data write. Therefore, it is anticipated that the write head may cool down during such a predetermined period of time although the write head has once been thermally expanded by a current supply. When a plurality of write heads are provided in accordance with the number of magnetic disk recording surfaces, the magnetic disk drive selectively uses one write head in accordance with a sector address within the same cylinder. When a current is sequentially supplied to a plurality of write heads to invoke thermal expansion, the write head initially powered for loading may be cool.

A feature of the present invention is to provide a magnetic recording apparatus that performs a stable write operation without degrading the write command processing performance when a data write operation begins in a state where the write head is unloaded onto the ramp. Another feature of the present invention is to provide a loading method that is executed by the magnetic recording apparatus.

According to a first aspect of the present invention, there is provided a magnetic recording apparatus comprising a magnetic disk; a write head for writing data onto the magnetic disk; a ramp for unloading the write head; a mechanism for causing the magnetic disk to start rotating while the write head is unloaded onto the ramp; a sensor for measuring an operating ambient temperature prevailing in the magnetic disk drive; and a preheat member for, when the operating ambient temperature is below a predetermined level, completing a preheat operation for the write head by supplying a preheat current before the magnetic disk reaches a rated rotation speed.

When the magnetic disk reaches its rated rotation speed, the conditions for completing a loading operation are established in terms of a head/slider assembly fly characteristic. Therefore, when a write head preheat operation is completed before the magnetic disk reaches its rated rotation speed, the write command processing performance does not deteriorate. When the preheat operation is performed so that the preheat time is equal to a remaining time that is required for the magnetic disk to reach the rated rotation speed, the preheat operation is completed the moment the magnetic disk reaches the rated rotation speed. Consequently, the conditions for loading completion are established at the time when the preheat operation is completed.

When a preheat sequence is executed multiple times, the temperature differences among a plurality of write heads decrease, thereby reducing the cooling effect. As a result, a stable write operation can be performed no matter what write head is used for the first data write after loading. When a write head for use in the first data write within the preheat sequence begins to supply a preheat current, the cooling effect can be further reduced. The cooling effect can be even more reduced by including a time zone for simultaneously supplying the preheat current to the plurality of write heads.

When the preheat current value is the same as a write current value for actual data write operations, a read head will not particularly be adversely affected. The write current value is set in accordance with a magnetic head characteristic and operating ambient temperature. When the frequency of the preheat current coincides with the preamble frequency, it is easy to generate the preheat current. In addition, the preheat operation can be completed within a shorter period of time than in the use of a direct current.

According to a second aspect of the present invention, there is provided a magnetic recording apparatus comprising a magnetic disk; a write head for writing data onto the magnetic disk; a ramp for unloading the write head; a loading mechanism for loading a write head that is unloaded onto the ramp; a sensor for measuring an operating ambient temperature prevailing in a magnetic disk drive; and a preheat member for, when the operating ambient temperature is below a predetermined level, completing a preheat operation for the write head by supplying a preheat current during the time interval between the instant at which loading of the write head starts and the instant at which loading of the write head is completed.

When the preheat current is supplied to complete a write head preheat operation during the time interval between the instant at which loading of the write head starts and the instant at which loading of the write head is completed, the write command can be promptly processed because the preheat time and loading time do not sequentially elapse.

According to a third aspect of the present invention, there is provided a magnetic recording apparatus comprising a magnetic disk; a plurality of write heads for writing data onto the magnetic disk; a ramp for unloading the plurality of write heads; a loading mechanism for loading a write head that is unloaded onto the ramp; a sensor for measuring an operating ambient temperature prevailing in a magnetic disk drive; and a preheat member for, when the operating ambient temperature is below a predetermined level, completing a preheat operation by executing a preheat sequence multiple times to supply a preheat current while sequentially selecting one of the plurality of write heads before completion of write head loading.

The present invention provides a magnetic recording apparatus that performs a stable write operation without degrading the command processing performance when a data write operation begins in a state where the write head is unloaded onto the ramp. The present invention also provides a loading method that is executed by the magnetic recording apparatus.

DETAILED DESCRIPTION OF THE INVENTION

Magnetic Disk Drive Configuration Overview

Figure 1:
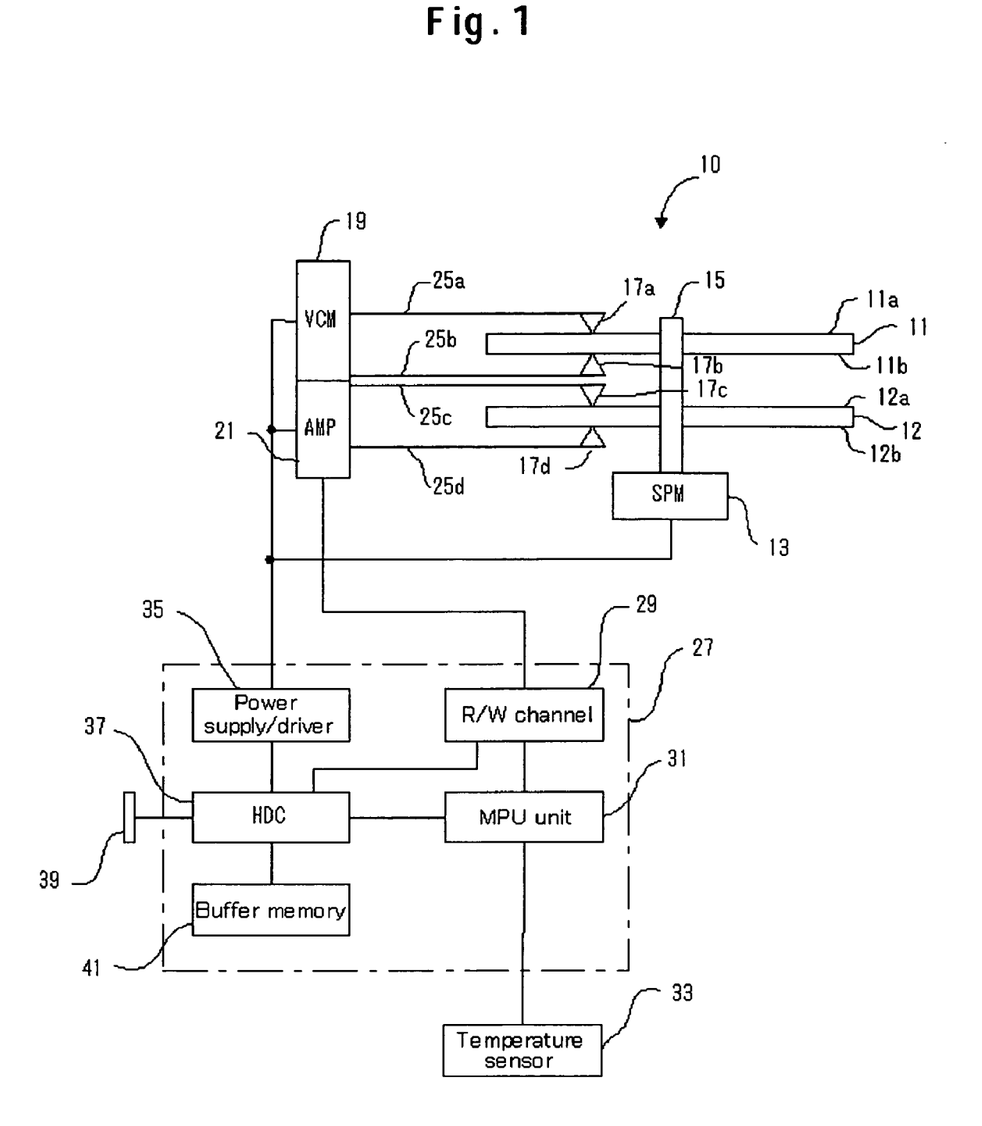
FIG. 1 is a block diagram that schematically shows the configuration of a magnetic disk drive according to one embodiment of the present invention.
Figure 2:
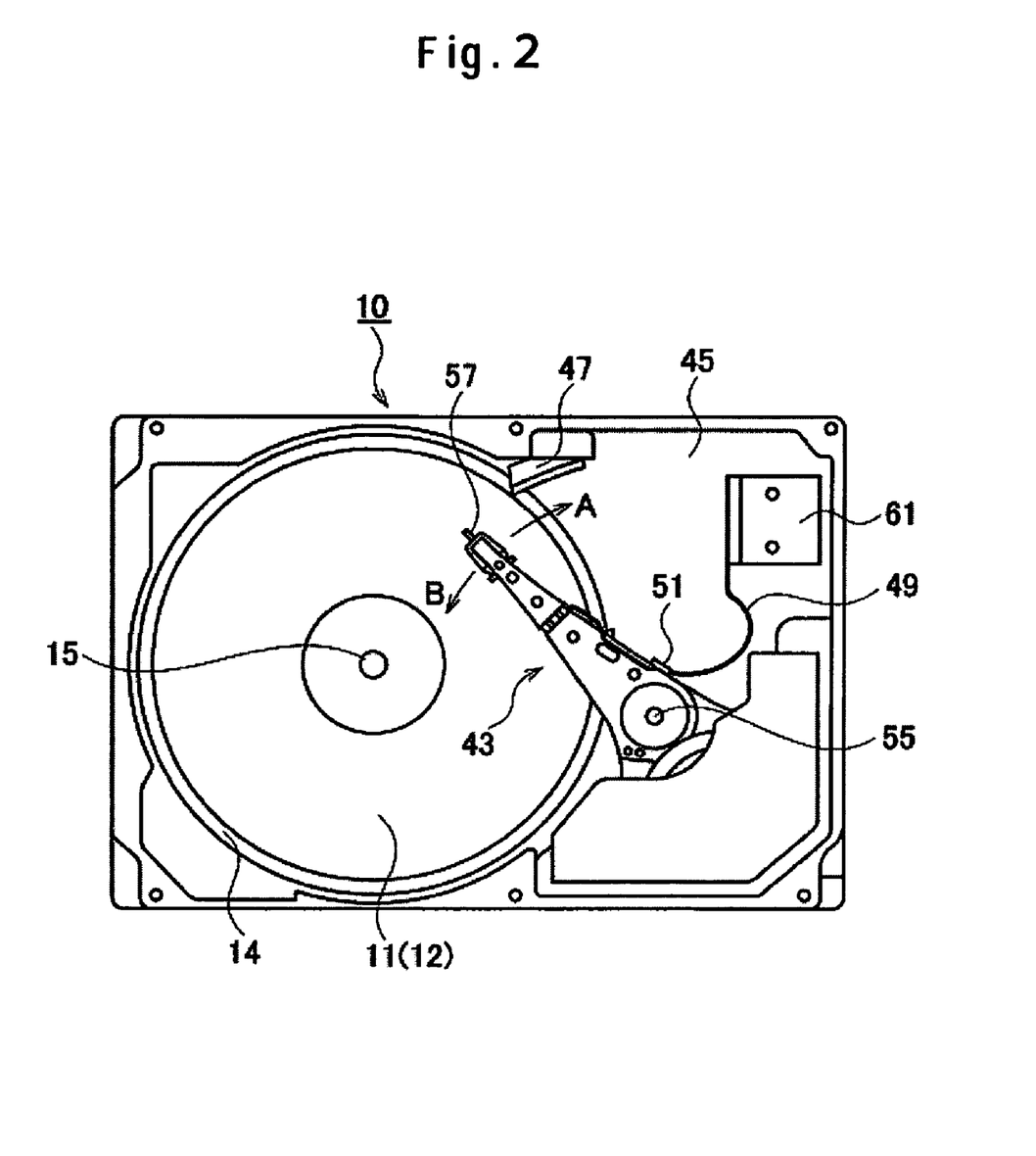
FIG. 2 is a block diagram that schematically shows the configuration of a magnetic disk drive according to one embodiment of the present invention.

FIG. 1 is a schematic block diagram illustrating a magnetic disk drive 10 according to one embodiment of the present invention. FIG. 2 is a schematic plan view. The magnetic disk drive is provided with a base 45. Various elements are housed in the base 45. Two magnetic disks 11 and 12 are provided as recording media. Magnetic disks 11 and 12 have recording surfaces 11*a* and 11*b* and recording surfaces 12*a* and 12*b*, respectively. A magnetic layer is formed on each recording surface. The surface of the magnetic layer is provided with a protective layer. Magnetic disks 11 and 12 are installed over a spindle shaft 15 and positioned at a predetermined distance from each other. A spindle motor (hereinafter referred to as the SPM) rotates the magnetic disks as an assembly. A plurality of tracks are concentrically formed on each recording surface. The tracks are defined by servo information. The outermost circumference of each recording surface is provided with a guard band 14, which is not used for a data write.

The magnetic disk drive 10 has four magnetic heads 17*a*, 17*b*, 17*c* and 17*d*, which correspond to recording surfaces 11*a*, 11*b*, 12*a*, and 12*b*, respectively. Each magnetic head is a complex head, which comprises an inductive write head and a GMR read head and is formed on a slider. One of the four magnetic heads is selected and activated during an operation in order to access a sector having an address designated by a host computer.

Head/slider assemblies on which magnetic heads 17*a*, 17*b*, 17*c*, and 17*d* are formed are mounted on head support mechanisms 25*a*, 25*b*, 25*c*, and 25*d*. Each head support mechanism comprises a suspension assembly, a carriage, and a voice coil motor (hereinafter referred to as the VCM) 19. Each head support mechanism turns on a pivot shaft 55 and positions a magnetic head over a specified cylinder of a corresponding magnetic disk. The cylinder is a circular recording area that comprises the tracks of a recording surface 11*a*, 11*b*, 12*a*, or 12*b*, which corresponds to magnetic head 17*a*, 17*b*, 17*c*, or 17*d*, when a magnetic head is positioned over a specified track of a magnetic disk. The combination of a head support mechanism and a head/slider assembly is referred to as the head stack assembly (hereinafter referred to as the HSA) 43. A merge lip 57 is formed at the end of the HSA 43 to engage with a ramp 47.

The head support mechanisms are provided with a head amplifier 21. The head amplifier 21 is positioned at a junction terminal block 51, which connects the wiring connected to the magnetic heads and a flexible printed circuit board (FPC) 49 connected to an external terminal 61. The head amplifier 21 mainly comprises a read/write driver (hereinafter referred to as the R/W driver), a driver register, and a read/write selector circuit (hereinafter referred to as the R/W selector circuit). Its detailed configuration will be described with reference to FIG. 3. The magnetic disk drive 10 employs a load/unload design so that the outer circumference of the magnetic disks 11 and 12 is provided with the ramp 47. When the head/slider assemblies are unloaded from the magnetic disk recording surface, the ramp 47 is used as a place for parking the head/slider assemblies before the SPM 13 is controlled to stop the rotation of the magnetic disks.

When the head/slider assemblies are to be unloaded from the magnetic disks, the VCM 19 moves the HSA 43 in the direction of arrow A until it comes into contact with an outer crash stop (not shown). In this instance, the merge lip 57 slides along a guide surface of the ramp 47 and then stops on an unloading surface. In this specification, the terms "load" and "unload" are used in relation to various elements such as the magnetic heads, head/slider assemblies, HSA 43, and merge lip 57. However, the operations of the elements are integral with the operation of the HSA 43. Therefore, the meanings of the above terms remain the same.

The magnetic disk drive 10 includes a circuit board 27 on which a read/write channel (hereinafter referred to as the R/W channel) 29, an MPU unit 31, a power supply/driver 35, a HDC 37, and a buffer memory 41 are mounted. The circuit board 27 is positioned outside the base 45 and connected to an FPC 49 via the external terminal 61. The R/W channel 29 includes, for instance, a modulation circuit for converting a data bit string into a bit string for recording onto a magnetic disk, a demodulation circuit for effecting reverse conversion, a parallel/serial converter for effecting conversion between parallel data and serial data, and a variable gain amplifier (VGA) for adjusting a read signal for a predefined voltage level.

The MPU unit 31 mainly comprises a microprocessor (MPU) for providing overall operation control of the magnetic disk drive 100, a ROM for storing a program for allowing the MPU to execute various programs and a data recording method according to an embodiment of the present invention, an EEPROM for storing various parameters, and a RAM for use as a program execution area or work area. The MPU unit 31 is connected to a temperature sensor 33, which measures an internal temperature. The temperature sensor 33 is mounted near the external terminal 61 to measure a typical temperature prevailing within the magnetic disk drive and send the measured temperature to the MPU unit 31.

The HDC 37 includes, for instance, a servo controller for controlling a seek operation and track following operation in accordance with servo data, a buffer controller for controlling the buffer memory 41, and an ECC (error connection code) circuit for generating a correction bit for a data bit transmitted from the host computer and correcting user data read from a magnetic disk. The buffer memory 41 is used to transfer data rapidly between the host computer and magnetic disk drive 10.

The power supply/driver 35 mainly comprises an SPM driver for supplying an operating current to the SPM 13, a VCM driver for supplying an operating current to the VCM 119, a DA converter, and a power supply circuit. The circuit board 27 carries an interface connector 39 for connecting to the host computer.

Head Amplifier Configuration

Figure 3:
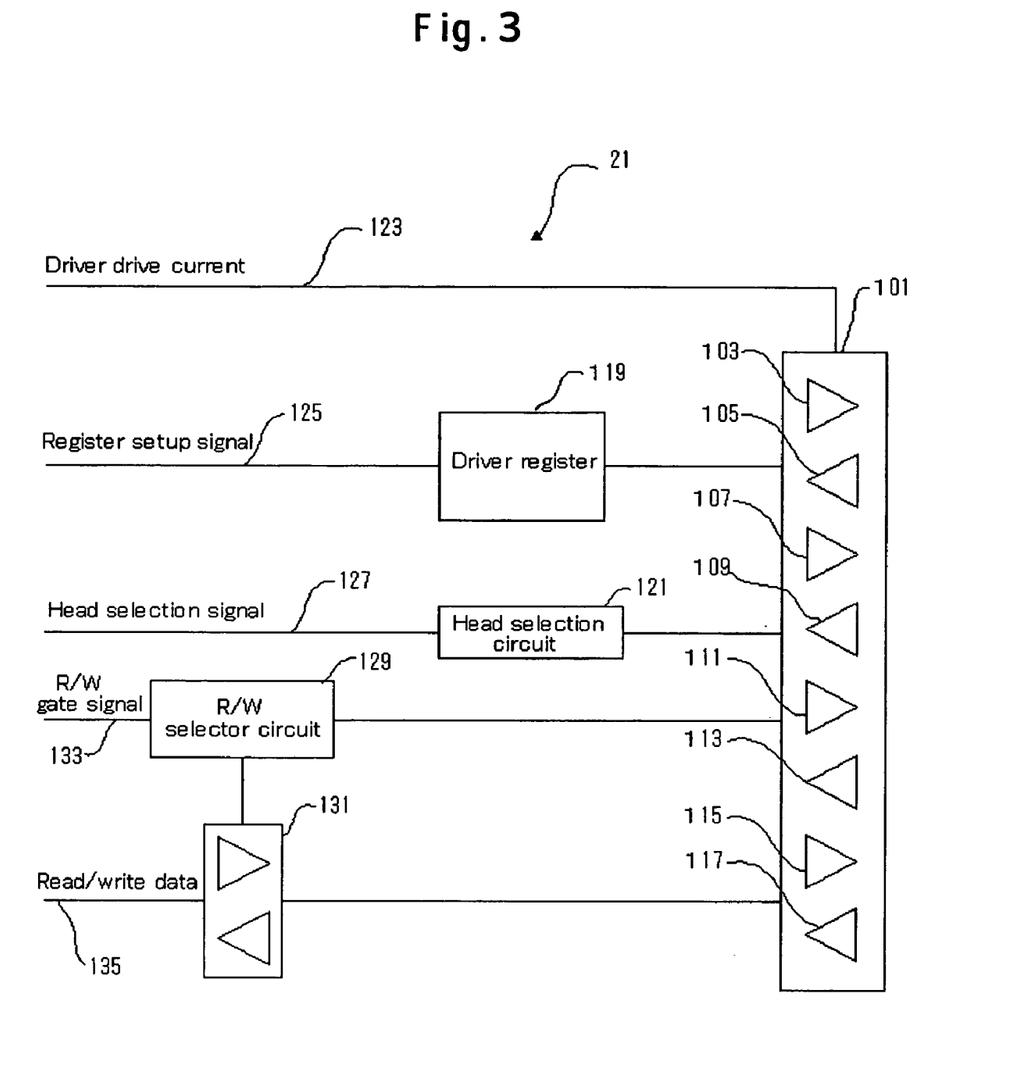
FIG. 3 is a schematic block diagram that illustrates a head amplifier.

FIG. 3 is a schematic block diagram illustrating the head amplifier 21, which generates a write current. The R/W driver 101 receives a driver drive current from the power supply/driver 35 via line 123. The R/W driver 101 includes write drivers 103, 107, 111, and 115, which supply a write current to magnetic heads (write heads) 17*a*, 17*b*, 17*c*, and 17*d*, respectively. The R/W driver 101 also includes read amplifiers 105, 109, 113, and 117, which supply a bias current to magnetic heads (read heads) 17*a*, 17*b*, 17*c*, and 17*d*, respectively, and read magnetic-field-induced electrical resistance changes recorded on a magnetic disk as voltage changes.

The R/W driver 101 has a circuit for generating a rectangular wave current, a circuit for generating an overshoot current, and a circuit for combining the generated rectangular wave current and overshoot current. The R/W driver 101 receives a digital signal from the driver register 119 and can change the magnitudes of the rectangular wave write current and overshoot write current independently of each other. The driver register 119 comprises a register for storing a digital setting concerning the rectangular wave current and a register for storing a digital setting concerning the overshoot current.

The MPU unit 31 references optimum parameters, which are set in a testing process, and performs a control data storage operation via line 125 for the registers composing the driver register 119 on an individual magnetic head basis. The value of the write current supplied to the write heads in a normal operating mode of the magnetic disk drive varies, for instance, from one magnetic head to another and with the operating ambient temperature. In this specification, the magnitude of a data write current represents an electrical current value that is set as a data value actually written by the user and does not represent a fixed value. The R/W selector circuit 129 receives a R/W gate signal via line 133. The received R/W gate signal is generated by the HDC 37 and relates to either a write operation mode or a read operation mode. Upon receipt of the R/W gate signal, the R/W selector circuit 129 changes the operation modes of the R/W driver 101 and R/W buffer 131.

When transferring user data for a write or read to the R/W channel 29 via line 135, the R/W buffer 131 temporarily records the user data. A head selection circuit 121 receives a head selection signal, which is generated by the HDC 37, via line 127, and activates one of the four magnetic heads 117a, 117b, 117c and 117d.

Ramp Structure

Figure 4:
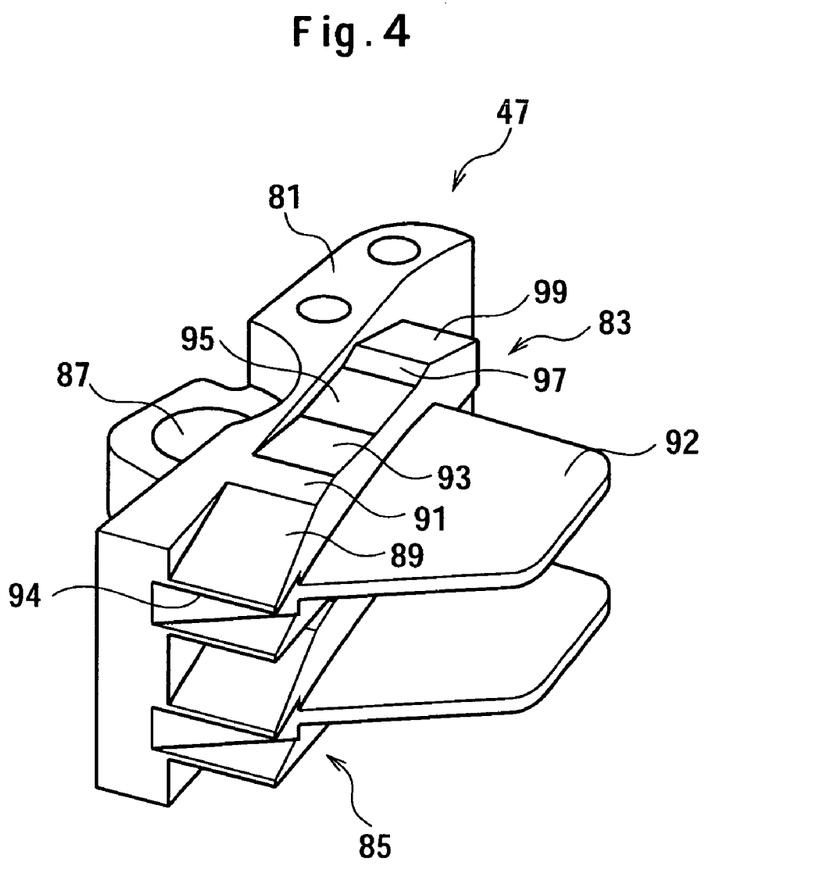
FIG. 4 is a perspective view of a ramp.

FIG. 4 is a perspective view of the ramp 47. The ramp 47 includes a support 81 and sliding sections 83 and 85, which are in the same form. The support 81 is provided with a bolt hole 87, which is used to fasten the ramp 47 to the base 45. Sliding section 83 is used to unload a head/slider assembly that corresponds to the recording surfaces 11a and 11b of magnetic disk 11. Sliding section 85 is used to unload a head/slider assembly that corresponds to the recording surfaces 12a and 12b of magnetic disk 12. Sliding section 83 has guide surfaces 89, 91, 93, 97, and 99 and unloading surface 95 for magnetic head 17a, which is shown in FIG. 1. Guide surface 89 is sloped upward relative to guide surface 91, whereas guide surfaces 93 and 97 are sloped downward relative to the unloading surface 95. Guide surface 99 is sloped downward from guide surface 97.

Guide surface 91 and unloading surface 95 are formed in such a manner that they are placed in a substantially horizontal position when mounted in the base 45. When the HSA 43 is to be unloaded in a normal operating state other than a state where a power failure or runaway is encountered, the VCM is driven to pivot the HSA 43 in the direction of arrow A in FIG. 2. In this instance, the merge lip 57 of the HGA first comes into contact with a predetermined part of a front end section 94 of sliding section 83, moves onto guide surface 89, slides along guide surfaces 89, 91, and 93, and reaches the unloading surface 95. The merge lip 57 stops when the carriage comes into contact with the outer crash stop. The position on the unloading surface 95 at which the merge lip 57 stops as described above is referred to as the home position of the HSA 43 or merge lip 57.

Guide surfaces 93 and 97 are sloped downward relative to the unloading surface 95 so that an elastic force is applied to the HGA in the direction of pressing the merge lip 57 against the unloading surface 95. Therefore, even if an external impulsive force is applied to the magnetic disk drive while the head/slider assembly is unloaded onto the unloading surface 95, the HSA 43 remains on the unloading surface 95. Sliding section 83 is additionally provided with a separator 92 so that an impulsive force generated while the head/slider assembly is unloaded and parked on the ramp 47 does not cause the HGA to jump, thereby bringing the sliders into contact with each other.

Description of HSA Loading Operation

Figure 5:
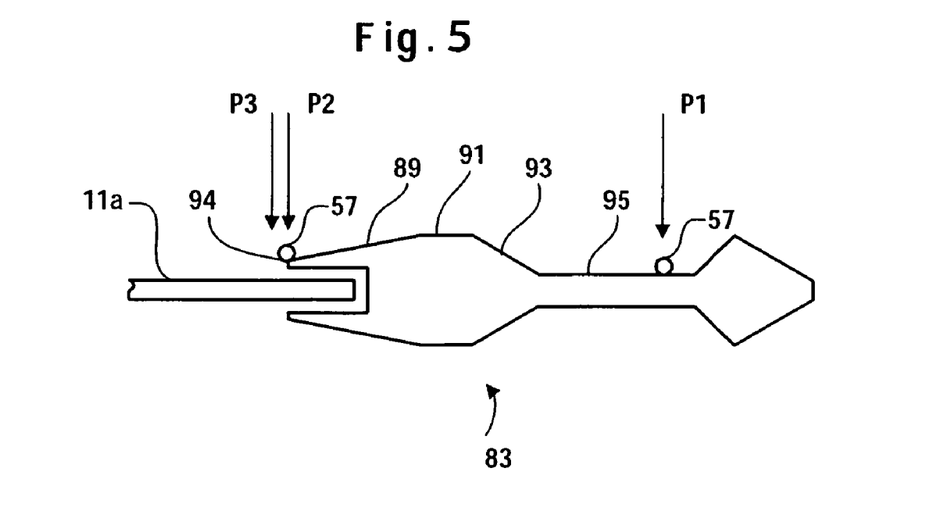
FIG. 5 is a schematic side view of a ramp sliding section.

FIG. 5 is a side view that schematically shows sliding section 83 of the ramp 47. Position P1 is the home position at which the HSA 43 is stopped with the merge lip 57 pressed against the unloading surface 95. A normal operation that is performed to load the HSA 43 will now be described. First of all, the magnetic disks are rotated to raise their rotation speed to a predetermined level. The HSA 43 is then moved in the direction of arrow B in FIG. 2 so that the merge lip 57 reaches the front end section 94 via guide surfaces 93, 91, and 89. While the merge lip 57 is in contact with a guide surface of the ramp 47, the head/slider assembly is hung from the ramp 47. As the merge lip 57 approaches the front end section 94, the head/slider assembly receives buoyancy from an airstream that is generated on the surface of the magnetic disk, which is rotating.

After the merge lip 57 leaves the front end section 94 due to continued magnetic disk rotation, the head/slider assembly flies above the magnetic disk surface at a position at which the airstream-induced buoyancy is in balance with the pressure load of the HGA while leaving a slight gap between the head/slide assembly and the magnetic disk surface. The moment the merge lip 57 leaves the front end section 94 at position P2, the posture of the head/slider assembly is likely to become unstable so that the head/slider assembly may readily come into contact with the magnetic disk surface. Therefore, the guard band 14 is provided as a circular area that is not to be used for data recording purposes. The magnetic disk rotation speed needs to be raised so as to give adequate buoyancy to the head/slider assembly at the instant at which the merge lip 57 leaves the front end section 94. It is preferred that such a required magnetic disk rotation speed be a rated rotation speed.

In this specification, a loading operation starts when the HSA 43 begins to rotate from the home position P1 to the front end section 94. The loading operation is completed when the merge lip 57 is at position P2 at which the merge lip 57 leaves the front end section 101. According to another definition, the loading operation is completed at position P3 at which the outline of the head/slider assembly, which moves toward the innermost track, comes into contact with the innermost periphery of the guard band. Since the HSA 43 needs to rotate while withstanding the friction force generated on the merge lip 57, which is pressed against the unloading surface 95 and guide surfaces 93, 91, and 89, the time interval between the instant at which the loading operation begins and the instant at which the loading operation is completed is much longer than the seek time during which the head/slider assembly flies above the magnetic disk surface. Therefore, when the write heads positioned on the ramp are to be preheated for a stable data write operation by supplying a preheat current, it is necessary to avoid an increase in the duration of a write command process.

Data Write Method

Figure 6:
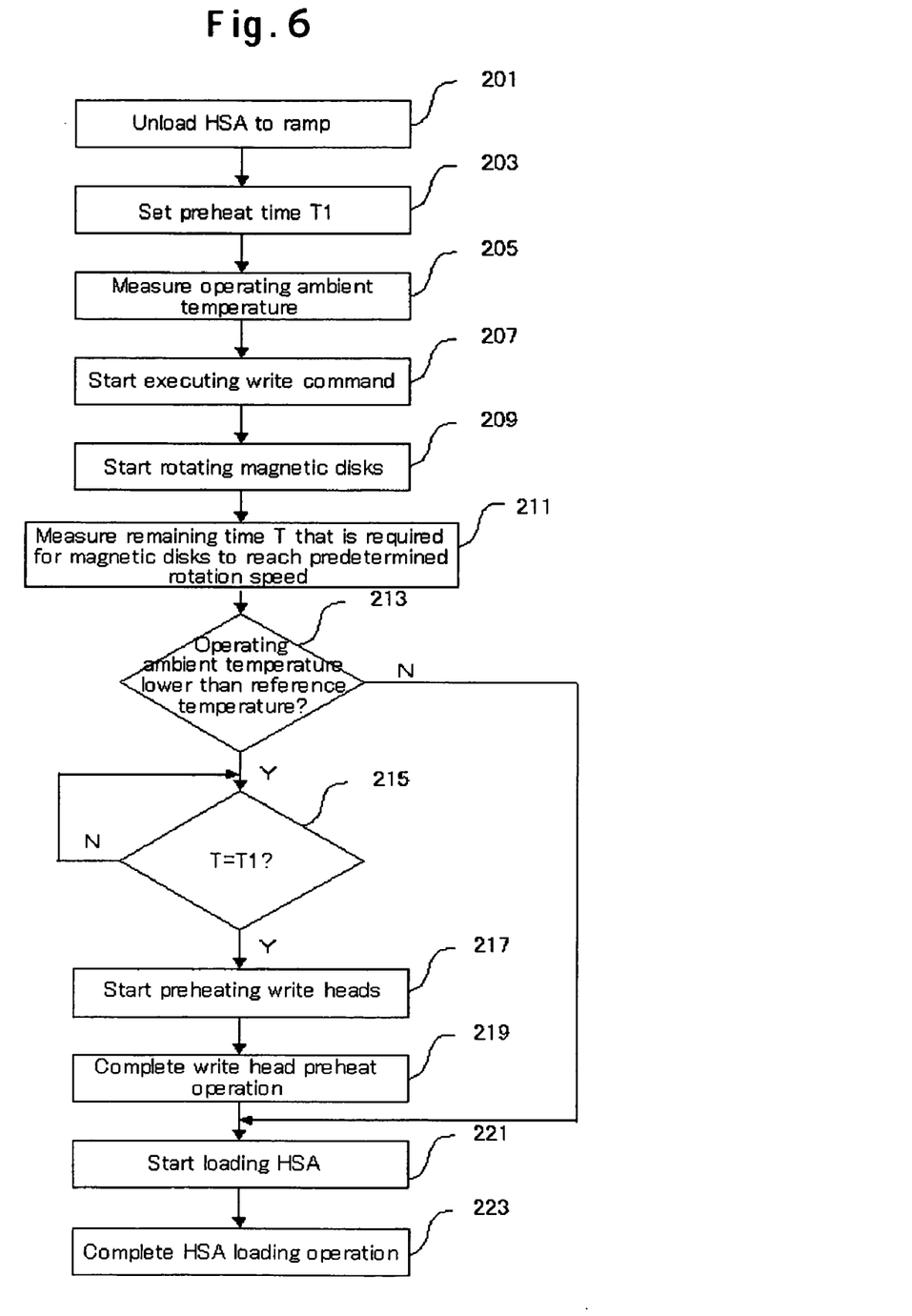
FIG. 6 is a flowchart illustrating a first loading method for recording data in accordance with one embodiment of the present invention.

The loading method to be used to perform a data write operation in the magnetic disk drive 10 while the write heads are unloaded and parked on the ramp 47 will now be described. FIG. 6 is a flowchart that illustrates data write steps according to the present embodiment. The steps indicated in FIG. 6 are performed when the MPU executes a program that is stored in the ROM of the MPU unit 31. In step 201, the HSA 43 is unloaded onto the ramp 47 and the merge lip 57 is placed at the home position P1. The MPU unloads the HSA 43 onto the ramp 47 in the stop mode in which the power supply is shut off to stop the operation of the magnetic disk drive 10 or in the standby mode in which a read/write operation is suspended for a period of longer than predefined because the host computer does not access the magnetic disk drive. In the standby mode, too, the magnetic disks stop rotating for power saving purposes. In the standby mode, however, power is still supplied to electronic circuits that are necessary for accepting a command input from the host computer.

However, the present invention also provides a data write method that is used when the write heads are unloaded onto the ramp 47 without rotating the magnetic disks. In step 203, the write head preheat time T1 is set. The preheat time T1 is factory preset prior to shipment. The MPU can reference the preheat time T1 as far as it is stored in the ROM within the MPU unit 31. The preheat time T1 is the time required for reducing the fly height when a preheat current is supplied to the write heads via write drivers 103, 107, 111, and 115 (see FIG. 3) to thermally expand the write heads and start a data write operation. The preheat time T1 is also required for raising the write head temperature to a specified level with Joule heat, and dependent on the magnitude of the preheat current.

In the present embodiment, a write current value for use in an actual data write operation is employed as a preheat current value. The preheat current value may be rendered slightly greater than the write current value for the purpose of reducing the preheat time. However, the preheat current value is limited because the use of an excessive preheat current value would adversely affect the read heads. The frequency of the preheat current is selected as a pattern frequency for a gain adjustment preamble that is to be recorded at the beginning of each sector. The preamble pattern frequency is a frequency that is usually used in the magnetic disk drive. Therefore, its use for the preheat current is easy, and preheating can be accomplished within a shorter period of time than in the use of a direct current. In a situation where there are a plurality of write heads as for the magnetic disks 10, the preheat time T1 represents the time required for preheating all the write heads.

In step 205, the MPU references the operating ambient temperature of the magnetic disk drive 10, which is measured by the temperature sensor 33. In step 207, the host computer connected to the interface connector 39 sends a write command to the magnetic disk drive 10. Alternatively, power is supplied to a stopped magnetic disk drive and then the host computer sends a write command to the magnetic disk drive.

In step 209, the MPU supplies a current to the SPM 13 from the power supply driver 35, thereby causing the magnetic disks to start rotating. In step 211, the MPU measures a remaining time T that is required for the magnetic disks to reach their rated rotation speed. The magnetic disk startup time, which is the time interval between the instant at which the magnetic disks start rotating and the instant at which the rated rotation speed is reached, is virtually constant. Therefore, the remaining time T can be measured by subtracting the elapsed time after the start of rotation from the startup time. The magnetic disk rotation speed may be used as a substitute for the remaining time T. In step 213, the MPU unit 31 judges whether the operating ambient temperature is lower than a reference temperature. The present invention is particularly effective for data recording when the operating ambient temperature of the magnetic disk drive is between 0° C. and 5° C. However, a reference temperature setting of 10° C. to 20° C. is employed to provide an adequate margin.

If the operating ambient temperature is not lower than the reference temperature, the program flow proceeds to step 221 in order to start loading the HSA 43 without preheating the write heads. If the judgment result obtained in step 213 indicates that the operating ambient temperature is lower than the reference temperature, the program flow proceeds to step 215 to compare the remaining time T against the preheat time T1. When the remaining time T is equal to the preheat time T1, the program flow proceeds to step 217 in order to start preheating the write heads. When data is to be written onto a specific cylinder, the R/W selector circuit 129 (FIG. 3) selectively activates one write driver (103, 107, 111, or 115) at all times. Therefore, the preheat current is sequentially supplied to the plurality of write heads.

The magnetic disk drive 10 has four write heads, and sequentially supplies the preheat current to the write heads for a predetermined length of time in the write head 17a, write head 17b, write head 17c, and write head 17d order. The sequence followed to sequentially supply the preheat current to write heads 17a through 17d is referred to as the preheat sequence.

When the preheat sequence is performed once, the write head preheat operation is completed in step 219. The preheat time T1, which is set in step 203, elapses in steps 217 and 219. The preheating sequence starts so that the remaining time T is equal to the preheat time T1 in step 215. Therefore, the magnetic disks reach the rated rotation speed in step 219. Consequently, it is possible to start loading the HSA 43 in step 221. Subsequently, the merge lip moves from the home position P1 of the ramp 47 to the loading completion position P1 or P2. In step 223, the HSA 43 is completely loaded.

Magnetic Disk Startup Time and Preheating/Loading Completion Timing

Figure 8:
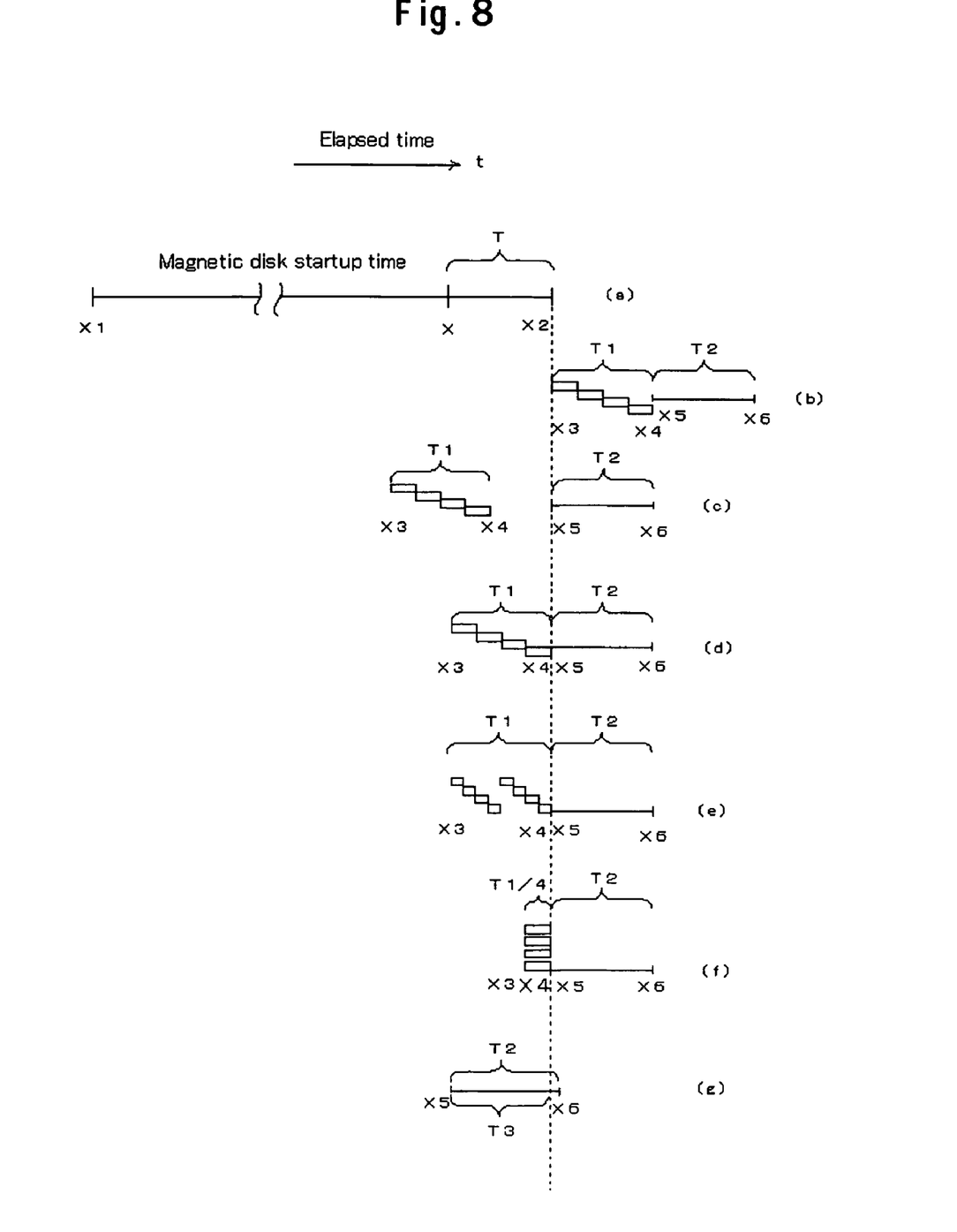
FIG. 8 is a timing diagram illustrating the relationship between magnetic disk startup time and write head preheating/loading operation.

FIG. 8 is a timing diagram illustrating the relationship between the startup time for the magnetic disks 10 and the preheating/loading operations for the write heads. In FIG. 8, time elapses in the direction of arrow t. Line map (a) indicates that the magnetic disks start rotating at startup start time X1 and reaches a predetermined rotation speed at startup completion time X2. In the present embodiment, the rated rotation speed is employed as the predetermined rotation speed. Line map (a) indicates remaining time T, which is the time interval between time X and startup completion time X2. Line maps (b) through (f) relate to a case where the magnetic disk drive has a plurality of write heads, and illustrate the relationship between the magnetic disk rotation speed and the preheat time T1 and loading time T2 of each write head. These line maps describe steps 215 and 221 in FIG. 6.

As regards the preheat time T1, magnetic disk rotation speed, and loading completion time X6, some conditions need to be satisfied in order to implement the present embodiment. A first condition is such that the loading completion time X6 for the HSA 43 needs to be subsequent to the startup completion time X2 at which the rated rotation speed is reached by the magnetic disks. At the prevailing rotation speed, the magnetic disks can give adequate buoyancy to the head/slider assembly when the merge lip 57 leaves the front end section 94 of the ramp 47. Therefore, the prevailing rotation speed is not limited to the rated rotation speed. It may alternatively be a speed that is lower than the rated rotation speed.

A second condition is such that the write heads need to be completely preheated at the loading completion time X6. Loading completion means that the write heads are ready to start writing into any data tracks. A third condition is such that the fly height does not increase at the beginning of a write operation because preheated write heads cool down due to a time elapse before a data write and the loading completion condition needs to be met for all the write heads in a situation where there are a plurality of write heads. A fourth condition is such that the time interval between the instant at which a write command is received from the host computer and the instant at which a write operation can be started needs to be as short as possible. Further, the magnitude of the preheat current or the magnitude of the thermal energy supply to the write heads is limited as described earlier in order not to adversely affect the magnetic head performance.

In an operation indicated in line map (b) in FIG. 8, the preheat sequence is performed once by sequentially supplying the preheat current, for a period of 50 msec at a time, to the four write heads 17a, 17b, 17c and 17d after the magnetic disks reach the rated rotation speed at the startup completion time X2. The loading operation for the HSA 43 is then started at preheat completion time X4, which comes after the elapse of a preheat time T1 of 0.2 msec in total. Therefore, the startup completion time X2 is equal to the preheat start time X3, and the preheat completion time X4 is equal to the loading start time X5.

Subsequently, the loading time T2 elapses at position P2 or P3 in FIG. 5, and then the loading operation is completed at the loading completion time X6. For this operation, the preheat time T1 and loading time T2 are required after the loading completion time X2. Therefore, condition 4 is not fully met although conditions 1 through 3 are met.

In an operation indicated in line map (c) in FIG. 8, the preheat operation starts in the same preheat sequence as indicated in line map (b) at the preheat start time X3, which precedes the startup completion time X2. The preheat operation is then completed at the preheat completion time X4, which precedes the startup completion time X2. Subsequently, after an elapse of a predetermined period of time, a loading operation starts at the startup completion time X2. In this operation, if the time interval between the instant at which the preheat operation is completed at the preheat completion time X4 and the instant at which the loading operation is completed at the loading completion time X6 is excessively long, the preheated write heads cool down so that the fly height increases due to a cooling effect. As a result, condition 3 may not be fully met. In the preheat sequence for the four write heads in particular, the cooling effect greatly works on write head 17a, which is the first write head to be preheated. If write head 17a, which was first preheated in the preheat sequence for the four write heads for writing data onto a specific cylinder, is used last after the loading completion time X6, the cooling effect further increases.

In an operation indicated in line map (d) in FIG. 8, the preheat operation starts in the same preheat sequence as indicated in line map (b) at the preheat start time X3, which precedes the startup completion time X2. The loading operation starts at the preheat completion time X4. In this operation, the preheat completion time X4, startup completion time X2, and loading start time X5 are equal. This operation corresponds to an operation indicated in steps 215 through 221 in FIG. 6. The employed setup is such that the remaining time T before the startup completion time X2 is equal to the preheat time T1. This operation satisfies conditions 1 through 4. In the mean time, the host computer sends a write command as well as a sector address of the data to be written. Therefore, the MPU knows to what recording surface of a cylinder the first write head that writes data corresponds. When the MPU uses such information to initiate the preheat sequence for the first write head that is used for a data write, heat is generated at the write head due to a data write current. Therefore, the cooling effect on the write head can be lessened. If, for instance, write head 17b is used first for a data write, the preheat sequence is sequentially set for write head 17b, write head 17c, write head 17d, and write head 17a.

In an operation indicated in line map (e) in FIG. 8, the preheat operation starts at the preheat start time X3, which precedes the startup completion time X2, and is completed at the startup completion time X2. However, the preheat sequence for the four write heads differs from the one used in line map (b). In the example indicated in line map (e), the preheat completion time X4, startup completion time X2, and loading start time X5 are equal. However, it does not constitute an essential condition for the indicated operation. For preheating in this case, the preheat sequence is performed two times running so that the preheat current is sequentially supplied to the write heads for a period of 25 msec at a time, which is half the period of time in line map (b).

More specifically, the write heads are sequentially selected in the write head 17a (25 msec), write head 17b (25 msec), write head 17c (25 msec), write head 17d (25 msec), write head 17a (25 msec), write head 17b (25 msec), write head 17c (25 msec), and write head 17d (25 msec) order. Further, the preheat operation is performed for a preheat time of 0.2 sec, which is the same as indicated in line maps (b) through (d). Consequently, when the cooling effect is considered, condition 3 can be met to an increased degree at the preheat completion time X4 because the temperature of the first preheated write head approaches the temperature of the last preheated write head within the preheat sequence. For best results, the number of preheat sequence repetitions should be increased because the write head temperature difference prevailing at the preheat completion time X4 can be reduced.

In an operation indicated in line map (f) in FIG. 8, the preheat operation starts at the preheat start time X3, which precedes the startup completion time X2, and is completed at the preheat completion time X4. However, the preheat operation is performed by simultaneously supplying the preheat current to the four write heads. Therefore, the preheat time T1 is ¼ the preheat time for the case shown in line map (d). In the example indicated in line map (f), the preheat completion time X4, startup completion time X2, and loading start time X5 are equal. However, it does not constitute an essential condition for the indicated operation. This operation meets conditions 1 through 4. Particularly, condition 3 is optimally met. However, common magnetic disk drives are configured so that a write current is not simultaneously supplied to the four write drivers in a user operating environment. The write current is simultaneously supplied to the four write drivers in a special operating mode, which is used in a factory testing/adjustment process for writing servo data onto the magnetic disks. At factory, electrical power can be supplied from the outside to simultaneously supply the write current to the magnetic disk drive 10. To permit the magnetic disk drive 10 to simultaneously supply the write current, however, the capacity of the power supply/driver 35 needs to be increased in order to drive write drivers 103, 107, 111, and 115. The preheat current supply time zones for the four write heads need not be in perfect agreement. It is necessary that the preheat current be simultaneously supplied for at least a brief period of time.

Line map (g) in FIG. 8 indicates the relationship between the startup completion time X2 and loading completion time X6. The first and second conditions are such that the loading completion time X6 must succeed the startup completion time X2, and that the preheat completion time X4 must precede the loading completion time X6. Therefore, when the preheat start time X3 is set so that the remaining time T is equal to the preheat time T1 and that the preheat completion time X4 is equal to the startup completion time X2, the loading completion time X6 should equal or succeed the startup completion time X2. Consequently, it is possible to perform setup so that the loading start time X5 precedes the startup completion time X2 as indicated in line map (g). In this manner, condition 4 can be satisfied to a greater degree than in the cases shown in line maps (c) through (f). As is the case with the preheat start time X3, the loading start time X5 can be set by measuring the remaining time T to the startup completion time X2. The difference between the loading time T2 and time T3 is a margin for allowing the loading completion time X6 to succeed the startup completion time X2.

Figure 7:
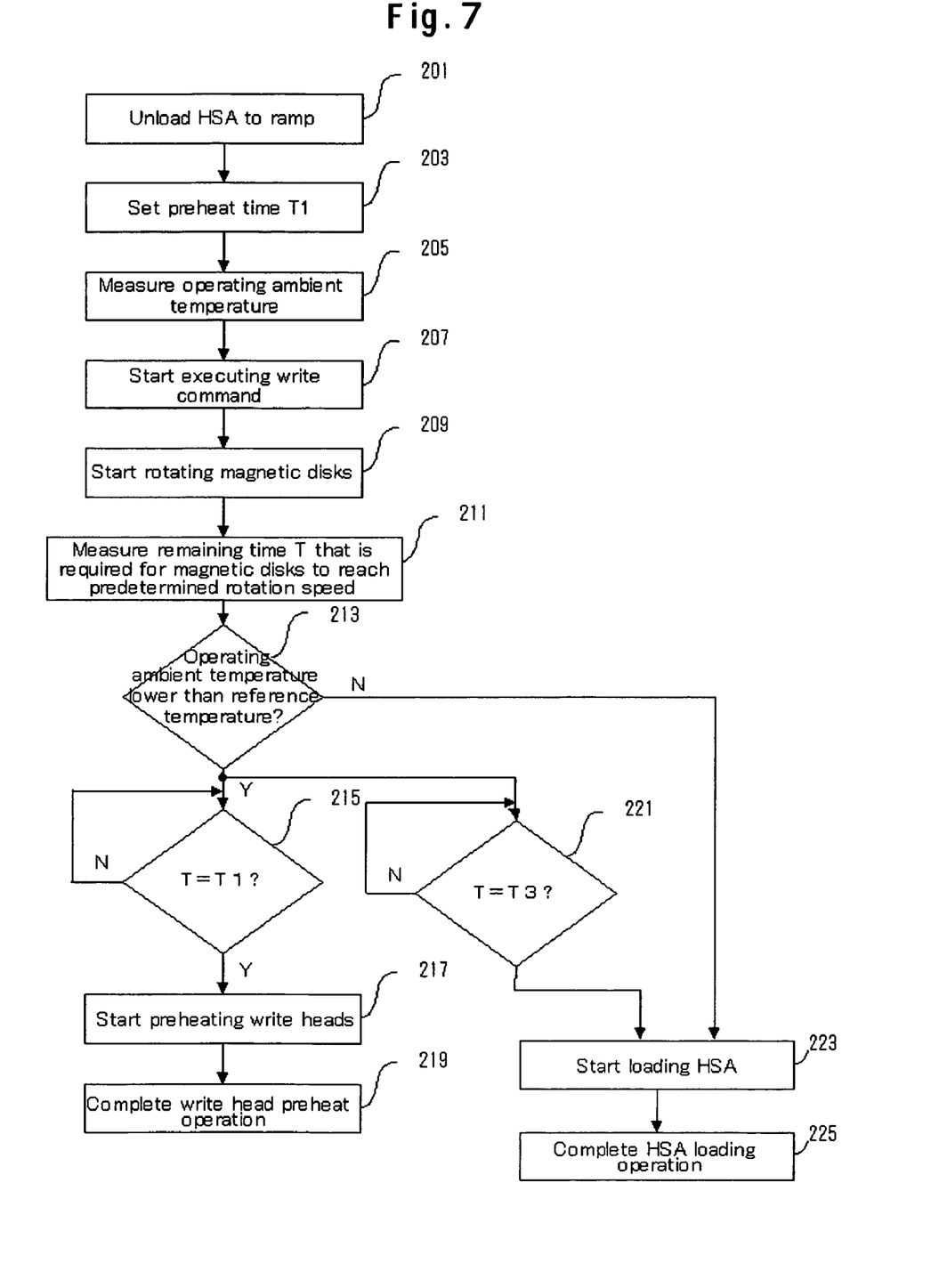
FIG. 7 is a flowchart illustrating a second loading method for recording data in accordance with one embodiment of the present invention.

FIG. 7 is a flowchart illustrating a loading method for a data write that is performed in accordance with the operation indicated in line map (g) in FIG. 8. The operation performed in steps 201 through 213 will not be described herein because it is the same as indicated in FIG. 6. The program flow proceeds to step 217 if step 213 indicates that the operating ambient temperature is lower than a predetermined level, and step 215 indicates that the remaining time T is equal to the preheat time T1. In step 217, a write head preheat operation starts. In step 219, the write head preheat operation is completed. The employed procedure differs from the one shown in FIG. 6 in that the former does not start loading the HSA 43 after completion of write head preheating.

The HSA 43 is loaded by performing steps 221 and beyond. If the step 213 indicates that the operating ambient temperature is lower than a predetermined level, the program flow proceeds to perform step 221 simultaneously with step 215. In step 221, time T3 and remaining time T are compared to detect the loading start time X5. If time T3 and remaining time T are equal, the program flow proceeds to step 223 and starts loading the HSA 43. After an elapse of the loading time T2, the HSA 43 is completely loaded in step 225. When the write head preheat time T1 and time T3, which contains a margin for the loading time T2, are set, it is possible to meet conditions 1 and 2 and satisfy condition 4 to a greater degree. The magnetic disk rotation speed may be used instead of the remaining time T in order to determine the loading start time X5.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic recording apparatus comprising:
   a magnetic disk;
   a write head for writing data onto said magnetic disk;
   a ramp for unloading said write head;
   a rotating mechanism configured to cause said magnetic disk to start rotating while said write head is unloaded onto said ramp;
   a sensor to measure an operating ambient temperature prevailing in a magnetic disk drive; and
   a preheat member that, when said operating ambient temperature is below a predetermined level, completes a preheat operation for said write head by supplying a preheat current to said write head before said magnetic disk reaches a rated rotation speed.

2. The magnetic recording apparatus according to claim 1, wherein said preheat member sets a preheat time that is required for preheating said write head, measures a remaining time that is required for said magnetic disk to reach said rated rotation speed, and starts supplying said preheat current to said write head at the time when said preheat time is equal to said remaining time.

3. The magnetic recording apparatus according to claim 1, wherein said magnetic disk drive includes a plurality of write heads; and wherein, before said magnetic disk reaches said rated rotation speed, said preheat member executes a preheat sequence multiple times to supply said preheat current while sequentially selecting one of said plurality of write heads.

4. The magnetic recording apparatus according to claim 3, wherein said preheat sequence begins by supplying said preheat current to a write head that records data onto said magnetic disk for the first time.

5. The magnetic recording apparatus according to claim 1, wherein said magnetic disk drive includes a plurality of write heads; and wherein said preheat member includes a time zone for simultaneously supplying said preheat current to said plurality of write heads.

6. The magnetic recording apparatus according to claim 1, wherein the magnitude of said preheat current is set as a write current value for writing data onto said magnetic disk.

7. The magnetic recording apparatus according to claim 1, wherein the frequency of said preheat current is a pattern frequency of a preamble that is to be recorded at the beginning of a sector.

8. A magnetic recording apparatus comprising:
   a magnetic disk;
   a write head for writing data onto said magnetic disk;
   a ramp for unloading said write head; a loading mechanism configured to load a write head that is unloaded onto said ramp;
   a sensor to measure an operating ambient temperature prevailing in a magnetic disk drive; and
   a preheat member that, when said operating ambient temperature is below a predetermined level, completes a preheat operation for said write head by supplying a preheat current to said write head during the time interval between the instant at which loading of said write head starts and the instant at which loading of said write head is completed.

9. The magnetic recording apparatus according to claim 8, wherein said loading mechanism starts said loading before said magnetic disk reaches a rated rotation speed.

10. The magnetic recording apparatus according to claim 9, wherein said loading mechanism determines the time to start said loading by measuring a remaining time that is required for said magnetic disk to reach said rated rotation speed.

11. The magnetic recording apparatus according to claim 9, wherein said loading mechanism determines the time to start said loading by measuring the rotation speed of said magnetic disk.

12. The magnetic recording apparatus according to claim 8, wherein said loading mechanism starts said loading after said magnetic disk reaches a rated rotation speed.

13. The magnetic recording apparatus according to claim 8, wherein said preheat member completes said preheat operation before said magnetic disk reaches a rated rotation speed.

14. The magnetic recording apparatus according to claim 8, wherein said magnetic disk drive includes a plurality of write heads; and wherein said preheat member executes a preheat sequence multiple times to supply said preheat current while sequentially selecting one of said plurality of write heads.

15. A magnetic recording apparatus comprising:
   a magnetic disk;
   a plurality of write heads for writing data onto said magnetic disk;
   a ramp for unloading said plurality of write heads;
   a loading mechanism configured to load a write head that is unloaded onto said ramp;
   a sensor to measure an operating ambient temperature prevailing in said magnetic disk drive; and
   a preheat member that, when said operating ambient temperature is below a predetermined level, completes a preheat operation by executing a preheat sequence multiple times to supply a preheat current to said write heads while sequentially selecting one of said plurality of write heads before completion of write head loading.

16. The magnetic recording apparatus according to claim 15, wherein said preheat member starts said preheat operation before said magnetic disk reaches a rated rotation speed.

17. The magnetic recording apparatus according to claim 15, wherein said loading mechanism begins to load a write head before said magnetic disk reaches a rated rotation speed.

18. The magnetic recording apparatus according to claim 15, wherein said loading mechanism begins to load a write head after said magnetic disk reaches a rated rotation speed.

19. A loading method for loading a write head from a ramp in order to record data onto a magnetic disk in a magnetic disk drive, which includes said magnetic disk, said write head for writing data onto said magnetic disk, and said ramp for unloading said write head, the method comprising:
   causing said magnetic disk to start rotating;
   measuring an operating ambient temperature prevailing within said magnetic disk drive;
   performing a preheating that, when said operating ambient temperature is below a predetermined level, completes a preheat operation for said write head by supplying a preheat current to the write head before said magnetic disk reaches a rated rotation speed.

20. The loading method according to claim 19, wherein said preheating completes a preheat operation for said write head by supplying a preheat current during the time interval between the instant at which loading of said write head starts and the instant at which loading of said write head is completed.

* * * * *